United States Patent [19]

Gerteisen et al.

[11] Patent Number: 4,500,595

[45] Date of Patent: Feb. 19, 1985

[54] STAINLESS STEEL FIBER-THERMOSPLASTIC GRANULES AND MOLDED ARTICLES THEREFROM

[75] Inventors: Steven R. Gerteisen; Richard M. Wenger; Glenn M. Cannavo, all of Evansville, Ind.

[73] Assignee: Plastic Specialties and Technologies, Inc., Barrington, Ill.

[21] Appl. No.: 400,779

[22] Filed: Jul. 22, 1982

[51] Int. Cl.³ .............................................. B32B 5/06
[52] U.S. Cl. ................................... 428/294; 156/181; 174/356 C; 264/108; 428/295; 428/297; 428/379; 428/412; 428/457; 428/902
[58] Field of Search ...................... 156/166, 180, 181; 428/285, 288, 290, 292, 295, 361, 379, 412, 457, 902, 922, 297, 294, 375; 264/108, 211; 174/35 GC

[56] References Cited

U.S. PATENT DOCUMENTS

| | | | |
|---|---|---|---|
| 2,877,501 | 3/1959 | Bradt | 264/143 |
| 3,041,131 | 6/1962 | Juras et al. | 428/174 |
| 3,042,570 | 7/1962 | Bradt | 264/174 |
| 3,184,368 | 5/1965 | Juras | 428/242 |
| 3,556,914 | 1/1971 | Juras | 428/297 |
| 3,837,986 | 9/1974 | Görter et al. | 264/108 |
| 3,949,141 | 4/1976 | Marzocchi et al. | 428/379 |
| 3,956,564 | 5/1976 | Hillig | 428/379 |
| 4,312,917 | 1/1982 | Hawley | 428/902 |

*Primary Examiner*—James J. Bell
*Attorney, Agent, or Firm*—Wood, Herron & Evans

[57] ABSTRACT

A composite plastic material having improved shielding against electromagnetic interference is provided by injection molding a molding compound comprising elongated granules obtained by incorporating into a thermoplastic resin matrix stainless steel fibers in the form of continuous strands.

11 Claims, No Drawings

STAINLESS STEEL FIBER-THERMOSPLASTIC GRANULES AND MOLDED ARTICLES THEREFROM

BACKGROUND OF THE INVENTION

The use of plastic housings for electronic equipment and components is widely accepted in the automotive and electronic equipment fields today. However, the presently available plastic materials suffer from the disadvantage of being transparent or permeable to electromagnetic interference commonly known as, and referred to, as EMI. This drawback in available plastic materials is a matter of considerable concern in view of the susceptibility of electronic equipment to the adverse effects of EMI emission by the growing number of consumer products which produce such EMI signals and to the increasing regulatory controls exercised over such electromagnetic pollution.

Currently, the major approach to solving plastic material shielding problems is through the application of metallic surface coatings to the molded plastic. Among such approaches are the use of vacuum deposition, metal foil linings, metal-filled spray coatings, zinc flame-spray and electric arc discharge. Each of these procedures is accompanied by one or more drawbacks with respect to cost, adhesion, scratch resistance, environmental resistance, the length of time required for application and the difficulties in adequately protecting many of the diverse geometrical forms in which the molded plastic must be provided.

More recently, attempts have been made to resolve the problem of EMI by formulation of composite plastic materials based upon the use of various fillers in thermoplastic matrices. Among the conductive fillers which have been employed for this purpose are carbon black, carbon fibers, silver coated glass beads and metallized glass fibers. However, these materials are subject to the disadvantages of being brittle to the extent that they break up into shorter lengths in processing. The shorter length fibers and particles require higher loadings or filler concentrations leading to embrittlement of the plastic matrix and higher costs which render them commercially unacceptable. Hence, none of the composite plastic products developed heretofore have proven completely satisfactory.

SUMMARY OF THE INVENTION

It has been found in accordance with the present invention that a composite product providing outstanding shielding against electromagnetic interferences is obtained by molding the reinforced thermoplastic resin composition obtained by incorporating into a thermoplastic resin matrix stainless steel fibers employed in the form of continuous strands.

The combination of this material with a thermoplastic resin enables the realization of a composite product with excellent electromagnetic interference shielding effectiveness. The composite products of the present invention are eminently suitable for use for shielding purposes in a wide variety of end use products such as radios, transmitters, computers and the like.

The composite comprising the thermoplastic resin and stainless steel fibers can be prepared according to procedures known to those skilled in the art. However, it has been found that the most advantageous properties are realized when such composites are prepared by the process of U.S. Pat. No. 2,877,501, the disclosure of which is incorporated herein by reference.

In the composite the fibers are commingled in the resin matrix and the resulting composition molded according to methods well known in the resin molding field. Preferably, however, the end products are prepared by injection molding and it is advantageous to employ this method of preparation for the achievement of optimum results.

DETAILED DESCRIPTION OF THE INVENTION

The fiber reinforced components can be advantageously prepared by what is known in the art as the "long glass" process, the resulting products being characterized in the art as "long fiber" products. The length of the majority of the fibers in these "long fiber" products will generally range well above the majority fiber length of the fibers in so-called "short fiber" products, which are normally in the range of about 0.01 inch to about 0.03 inch, and will generally extend the full length of the pieces themselves. The fiber form can be continuous roving of from 60 to 20,000 filaments or a staple yarn which may nominally contain 2,000 filaments. The staple yarn is comprised of a continuous strand which is made up of discreet lengths of fiber the range of which may be 3" to 10" long for each single fiber length. These discreet fiber lengths are often referred to as "slivers". This process generally involves the use of continuous lengths of filaments which are passed through a bath containing molten resin whereby such filaments become impregnated with the desired quantity of resin. Once the continuous filaments are impregnated they are continuously withdrawn from the bath, commingled, either before or after passage through a heat source, and cooled to solidify the molten resin around the stainless steel fibers followed by a substantially transverse severing operation to form the short pieces. These pieces are similar to the pieces of the above described "short fiber" products in that the fibers extend substantially parallel to each other and substantially parallel to the axis defined by the direction in which the materials are withdrawn from the bath. However, contrary to the "short fiber" products, the fibers of the "long fiber" products extend substantially the entire distance from one severed side of the piece to the other severed side. Again, the "long fiber" product pieces may range from about 1/16 inch to about 1½ inches, preferably ¼ inch to 1 inch. A process of this type is described in U.S. Pat. No. 3,042,570, the disclosure of which is incorporated by reference.

It is understood that rather than using a bath of molten resin in the above process the filaments may be impregnated with a resin suspension or emulsion and subsequently subjected to sufficient heat to dry and fuse the resin around the commingled filaments. Such a process is described in U.S. Pat. No. 2,877,501.

In both products, that is, the "short fiber" products and "long fiber" products, the cross-sectional dimensions may vary considerably depending on several factors. With the "short fiber" products, which are formed by extruding strands, the cross-sectional dimension will depend upon the size of the extrusion orifice. With the "long fiber" products, which are formed by impregnating continuous lengths of filaments, the cross-sectional dimension will depend upon the total number of filaments being impregnated and gathered together and the amount of resin. There are, of course, certain practical limits on the cross-sectional dimensions of the pieces due to processing limitations. In general, it has been found most convenient to form pieces having nominal cross-sectional dimensions in the range of about 1/16 inch to about ¼ inch.

Elongated granules containing the stainless steel fibers in the thermoplastic resin matrix are prepared using one of the procedures described earlier in this application. After preparation of the elongated granules of stainless steel fibers in thermoplastic resin, illustratively, in polycarbonate resin, the resulting composite is then molded in accordance with known procedures. Homogenization will be effected in the molding step.

The proportions by weight of the components in the final blend can be varied over a range of total fiber reinforcement to resin of from about 0.5% to about 60%, with a preferred range of from about 1% to about 8% by weight. Within this range, selection of the optimum proportion will be dependent on the end application or the particular objective sought. For optimum results, in some circumstances it has been found that a proportion of fiber to resin of from 1% to 5% by weight is most advantageous for electrostatic dissipation and from 1% to 19% by weight for EMI/RFI shielding applications.

It is, of course, possible to include conventional glass fiber, such as "E" glass fiber, in the composition as an extender. Similarly, other conventional fillers, pigments and the like may also be included.

The reinforcing fibers employed according to the present invention are stainless steel fibers. These fibers are available in roving form and in chopped form. In the practice of the present invention, it has been found necessary to utilize the stainless steel fibers in the form of staple yarn, rovings or continuous strands.

Our investigations have shown that when the stainless steel fiber is employed in chopped form, no appreciable EMI/RFI shielding or electrical conductivity is realized without the use of excessive loading levels, of the order of about 25%. It is only when the stainless steel fibers are used in the form of continuous tow or staple yarn that the desired EMI/RFI shielding and electrical conductivity are obtained at substantially lower loadings than possible with the short fiber product. The lower loadings provide for greater impact, ductility and lower cost as compared to the short fiber products.

Thermoplastic resins in general may be employed in producing the reinforced resin component. Included among these resins are polyolefins, particularly polypropylene and copolymers of ethylene and propylene; polystryene, styrene-acrylonitrile polymers, ABS polymers (polymers based on acrylonitrile-polybutadiene-styrene); nylons, particularly Nylon 6,6; polyphenylene oxides; polyphenylene oxide-polystyrene blends; polyphenylene sulfides; polyacetals; polysulfones; polycarbonates; polyurethanes; cellulose esters; polyesters such as polyethylene terephthalate; polymonochlorostyrene; acrylic polymers; polyvinyl chlorides; polyvinylidene chlorides; copolymers of vinyl-chloride and vinylidene chloride, various thermoplastic elastomers such as those based on styrene and butadiene or ethylene or propylene; and blends of any of the foregoing resins.

In processing the composite material of this invention, the mixture is fed in the normal manner to a feed hopper of the injection molding equipment. Thereafter, the mixture is processed through the equipment in the usual manner at temperature conditions which render the resin molten and flowable.

The following examples illustrate the present invention but are not to be construed as limiting the scope thereof.

EXAMPLE 1

A composition of elongated pellets containing 5% stainless steel fiber product produced by blending a 30% stainless steel filled long fiber polycarbonate granule with unfilled polycarbonate at the ratio of 1 to 5 is fed to a screw-type injection molding machine. The composition is processed in the machine at temperatures in the range of 500° to 580° F., providing a molded product having desirable uniformity of appearance and good physical properties.

For purposes of comparison, elongated pellets containing 15% of stainless steel chopped fiber of 8 micron diameter in polycarbonate resin is processed under identical conditions and the molded product obtained is tested against the product containing the continuous strand stainless steel fibers for EMI shielding effectiveness. The results of this comparative testing are set forth in Table I below.

TABLE I

|  | Chopped Fiber | Continuous Strand |
|---|---|---|
| Shielding Effectiveness at 1000 MHz flat panel dB | 1 | 40 |

EXAMPLE 2

Compositions containing the amounts and the forms of stainless steel fiber shown in Table II were prepared and molded by the procedure set forth in Example 1. The resulting products were tested and the results of the tests are set forth in Table II.

TABLE II

| Polycarbonate Containing | Flat Panel Shielding Effectiveness at 1000 MHz, dB | | |
|---|---|---|---|
|  | 5% | 10% | 15% |
| 3 mm 8 micron[a] Chopped Stainless Steel Fiber | 0 | 0 | 1 |
| 8 micron continuous[b] Stainless Steel Fiber Controls | 38.5 | 40.5 | — |
| 8% Fiberglass in Polycarbonate | 0 dB | | |
| Polycarbonate - Nickel Paint | 55 | | |

[a] Pellet length ⅛"
[b] Pellet length ¾"-½"

EXAMPLE 3

Compositions containing the amounts and the forms of stainless steel fiber shown in Table III were prepared and molded as in Examples 1 and 2. The resulting products were tested for conductivity and EMI shielding and the results thereof are set forth in Table III.

TABLE III

| CONDUCTIVITY AND EMI SHIELDING OF LONG FIBER AND SHORT FIBER STAINLESS STEEL FIBER MOLDING COMPOUND | | | |
|---|---|---|---|
|  | A | B | C |
| Bulk Resistivity of 3" × 6" × .125" plaque, ohms | ∞ | 400 | 30 |
| EMI Shielding Effectiveness of 6" × 6" × .125" plaque dB at | 10 | 20 | 35 |

TABLE III-continued
CONDUCTIVITY AND EMI SHIELDING OF LONG FIBER AND SHORT FIBER STAINLESS STEEL FIBER MOLDING COMPOUND

|  | A | B | C |
|---|---|---|---|
| 1000 MHz |  |  |  |

Explanation:
A - Polycarbonate containing 5 weight percent 4 micron 6 mm chopped stainless steel fiber randomly dispersed in ¼" long pellets.
B - Polycarbonate containing 5 weight percent 8 micron continuous stainless steel fiber impregnated in ¼" long pellets.
C - Polycarbonate containing 5 weight percent 8 micron continuous stainless steel fiber impregnated in ⅜" long pellets.
∞ - Infinity indicates open circuit, i.e. no conductivity.

We claim:

1. A thermoplastic resin elongated granule providing improved electromagnetic interference shielding properties comprising a thermoplastic resin elongated granule having incorporated therein a fiber constituent comprised of continuous strands of stainless steel fibers, said fibers extending substantially parallel to each other and substantially parallel to a length of the elongated granule.

2. An elongated granule according to claim 1 wherein the fiber component and the resin component are present by over a range of fiber to resin of from about 0.5% to about 60% by weight.

3. An elongated granule according to claim 1 wherein the range of fiber to resin is from about 1.0% to about 8.0% by weight.

4. An elongated granule according to claim 1 wherein the thermoplastic resin is a member selected from the group consisting of polyolefins, polystyrene, styrene-acrylonitrile polymers, acrylonitrile-polybutadiene-styrene, nylon, polyphenylene sulfides, polyacetals, polysulfones, polycarbonates, polyurethanes, cellulose esters, polyester, acrylic polymers, polyvinyl chlorides, polyvinylidene chlorides, copolymers of vinyl chloride and vinylidene chloride, polyphenylene oxides, polyphenylene oxide-polystyrene blends and blends of any of the foregoing resins.

5. An elongated granule according to claim 4 wherein the composition resin is a polycarbonate resin.

6. Molded products characterized by superior electromagnetic interference shielding properties derived from elongated granules as claimed in claim 1.

7. Molded products as claimed in claim 6 when formed by an injection molding process.

8. A molded article characterized by superior electromagnetic interference shielding properties comprising a polymeric matrix and continuous strands of stainless steel fibers, wherein said article is derived from the elongated granules of claim 1 having incorporated therein said fibers which extend substantially entirely over said length of said elongated granule.

9. An elongated granule of claim 1 wherein said steel fibers comprise from about 60 to about 20,000 filaments.

10. An elongated granule of claim 1 wherein said granule has a length of from about 1/16 to about 1½ inches and a nominal cross-section of about 1/16 to about ¼ inch.

11. An elongated granule of claim 10 wherein each of said fibers has a diameter of about 8 microns.

* * * * *